US012562937B2

(12) United States Patent
Lorenz et al.

(10) Patent No.: US 12,562,937 B2
(45) Date of Patent: Feb. 24, 2026

(54) ELECTRIC/ELECTRONIC ARCHITECTURE FOR A MOTOR VEHICLE WITH AN ELECTRONIC COMPUTING DEVICE AND AN INTERFACE CONTROLLER, AND METHOD

(71) Applicant: Bayerische Motoren Werke Aktiengesellschaft, Munich (DE)

(72) Inventors: Tobias Lorenz, Allershausen (DE); Andreas Pfeiffer, Holzkirchen (DE); Martin Schaefer, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 267 days.

(21) Appl. No.: 17/794,667

(22) PCT Filed: Jan. 18, 2021

(86) PCT No.: PCT/EP2021/050882
§ 371 (c)(1),
(2) Date: Jul. 22, 2022

(87) PCT Pub. No.: WO2021/148333
PCT Pub. Date: Jul. 29, 2021

(65) Prior Publication Data
US 2023/0091306 A1     Mar. 23, 2023

(30) Foreign Application Priority Data
Jan. 23, 2020    (DE) ..................... 10 2020 101 524.0

(51) Int. Cl.
*H04L 12/40*        (2006.01)
*B60R 16/023*       (2006.01)

(52) U.S. Cl.
CPC .... *H04L 12/40169* (2013.01); *B60R 16/0231* (2013.01); *H04L 2012/40273* (2013.01)

(58) Field of Classification Search
CPC ..... H04L 12/40169; H04L 2012/40273; B60R 16/0231
See application file for complete search history.

(56) References Cited

U.S. PATENT DOCUMENTS

2006/0190155 A1    8/2006  Meyer et al.
2009/0150034 A1*   6/2009  Ezoe ......................... B60T 7/22
                                                     701/53
(Continued)

FOREIGN PATENT DOCUMENTS

DE        102 48 843 A1     5/2004
DE     10 2004 047 165 A1    4/2006
(Continued)

OTHER PUBLICATIONS

International Search Report (PCT/ISA/210) issued in PCT Application No. PCT/EP2021/050882 dated Apr. 22, 2021 with English translation (four (4) pages).
(Continued)

*Primary Examiner* — Naeem Taslim Alam
(74) *Attorney, Agent, or Firm* — Crowell & Moring LLP

(57) ABSTRACT
An electric/electronic architecture for a motor vehicle includes an electronic computing device for communicating with at least one actuator of the motor vehicle. The electric/electronic architecture has an interface controller which is contacted by at least one sensor device of the motor vehicle and the electronic computing device, wherein the at least one actuator directly communicates with the electronic computing device, and the at least one sensor device directly communicates with the interface controller.

15 Claims, 1 Drawing Sheet

(56) References Cited

U.S. PATENT DOCUMENTS

| | | | | | |
|---|---|---|---|---|---|
| 2011/0125381 | A1* | 5/2011 | Szell | ...................... | B60T 7/042 |
| | | | | | 701/70 |
| 2016/0031422 | A1* | 2/2016 | Gotoh | ................... | G05G 1/327 |
| | | | | | 60/594 |
| 2016/0185325 | A1* | 6/2016 | Ike | ..................... | B60T 8/17558 |
| | | | | | 701/70 |
| 2018/0086336 | A1 | 3/2018 | Jones et al. | | |
| 2018/0290642 | A1 | 10/2018 | Tschiene | | |
| 2019/0023244 | A1* | 1/2019 | Mastrocola | .......... | F16D 65/186 |
| 2019/0299786 | A1* | 10/2019 | Nakagawa | ................ | B60L 3/00 |
| 2020/0059439 | A1 | 2/2020 | Kostrzewq et al. | | |
| 2020/0276986 | A1 | 9/2020 | Kraemer et al. | | |
| 2021/0188233 | A1* | 6/2021 | Yuyama | ................ | H02K 11/33 |
| 2023/0356728 | A1* | 11/2023 | Jain | ......................... | G06F 3/013 |

FOREIGN PATENT DOCUMENTS

| | | | |
|---|---|---|---|
| DE | 10 2006 057 493 | A1 | 6/2008 |
| DE | 10 2007 060 649 | A1 | 6/2009 |
| DE | 10 2017 109 703 | B3 | 6/2018 |
| DE | 10 2017 201 702 | A1 | 8/2018 |
| DE | 10 2017 209 721 | A1 | 10/2018 |
| DE | 10 2017 217 016 | A1 | 3/2019 |
| DE | 10 2017 220 472 | A1 | 5/2019 |

OTHER PUBLICATIONS

German-language Written Opinion (PCT/ISA/237) issued in PCT Application No. PCT/EP2021/050882 dated Apr. 22, 2021 (nine (9) pages).

German-language Search Report issued in German Application No. 10 2020 101 524.0 dated Dec. 19, 2020 with partial English translation (11 pages).

* cited by examiner

ELECTRIC/ELECTRONIC ARCHITECTURE FOR A MOTOR VEHICLE WITH AN ELECTRONIC COMPUTING DEVICE AND AN INTERFACE CONTROLLER, AND METHOD

FIELD

The present invention relates to an electrical/electronic architecture for a motor vehicle. Furthermore, the present invention relates to a method.

BACKGROUND AND SUMMARY

X-by-wire systems are already known from automotive engineering, as are highly and fully automated motor vehicles. For this purpose, corresponding requirements are placed on X-by-wire systems for example for at least partially autonomously operated motor vehicles, which have a high requirement for the availability of functional points. In the prior art, this availability is established by redundancy of active chains. This redundancy is performed according to the prior art by duplicating control units. This is due in particular to the fact that the motor vehicle is manufactured according to so-called "bottom-up" development. As a result, complex systems and high interdependencies arise.

DE 10 2017 220 472 A1 discloses a method for data-oriented information exchange with a vehicle network, wherein a connection control unit of the vehicle network receives an external query of interest that designates data available via the vehicle network, wherein the vehicle network performs case-by-case routing of the queries of interest within the vehicle network based on the designated data, and the connection element returns a data response dependent on the query of interest.

The object of the present invention is to achieve an electrical/electronic architecture for a motor vehicle, and a method by means of which the motor vehicle can be operated with a reduced number of components.

This object is achieved by an electrical/electronic architecture, as well as by a method according to the independent patent claims. Advantageous embodiments are specified in the subclaims.

One aspect of the present invention relates to an electrical/electronic architecture for a motor vehicle, comprising an electronic computing device for communicating with at least one actuator of the motor vehicle.

It is provided that the electrical/electronic architecture comprises an interface control unit that is in contact with at least one sensor device of the motor vehicle and the electronic computing device, wherein the at least one actuator communicates directly with the electronic computing device, and the at least one sensor device communicates directly with the interface control unit.

As a result, it is possible to provide the electrical/electronic architecture having a reduced number of components. The electrical/electronic architecture is also referred to as the E/E architecture. In particular, a so-called "top-down" approach can thus be provided for the E/E architecture. In particular, an E/E architecture can thus be provided from a functional point of view.

In particular, communication also takes place between the interface control unit and the electronic computing device.

For example, the equipment and function variants can thus be mapped in the interface control unit, while the actuators can form a true modular system across vehicle series. The electronic computing device is scalable, also with respect to technical advancements of microprocessors, as they exclusively provide computing power and are connected via standardized buses. Furthermore, it is thereby possible for the active chains to be generated on the basis of a degradation principle. By means of self-diagnosis, each of the redundant active chains detects a malfunction. The sensor device, the actuators, and the computing platform, each independently. The components enter a safe state, a so-called fail-silent state, and the affected active chain shuts down completely. As a result, the E/E architecture can also be implemented in emergency mode.

As an alternative to the interface control unit, an interface concentrator can also be used. In particular, both the interface concentrator and the interface device can communicate primarily unidirectionally with the electronic computing device. The interface control unit supplies the at least one sensor device and for example simple actuators such as DC motors with pulse width control, reads out switches, reads in sensor values, and processes them digitally. Furthermore, the interface control unit can actuate display elements. In particular, the interface control unit and the interface concentrator have fast communication with short cycle time with the electronic computing device. Furthermore, the interface control unit can also be programmed based on a master-slave configuration and may include for example a hardware acceleration device.

According to an advantageous embodiment, the at least one actuator communicates with the electronic computing device by means of a bidirectional bus. In particular, the bidirectional bus is very fast, as a result of which the actuators can communicate with the electronic computing device at a correspondingly high speed. This has in particular the advantage that the actuators can be actuated very quickly, as a result of which the control quality can be increased and safety in road traffic can thereby be increased.

It is also advantageous if the interface control unit communicates with the electronic computing device via a unidirectional bus. As a result, it is possible to achieve simple yet reliable communication between the electronic computing device and the interface control unit.

It is also advantageous if the at least one actuator is configured as an intelligent actuator. The intelligent actuator may also be referred to as a so-called smart actuator. This actuator communicates with the electronic computing device in particular via a fast bidirectional bus. No higher-level functions are implemented within the smart actuator. In particular, no other external sensors are connected to the smart actuator.

Furthermore, it has proven advantageous if the electronic computing device comprises only one power supply interface for the at least one actuator, for the at least one sensor device, and for the interface control unit, and only one bus interface for communicating with the at least one actuator and the interface control unit. In other words, the electronic computing device is configured only to supply power and to provide the bus system. As a result, the electrical/electronic architecture can be provided having a reduced number of components.

Furthermore, it has proven advantageous if the at least one actuator is configured to control only one manipulated variable of the actuator, to detect an actual variable of the actuator, and to transmit the actual variable to the electronic computing device. In other words, the at least one actuator is configured in particular as an intelligent actuator. This actuator is connected to the electronic computing device via a fast bidirectional bus and offers as a function only the control of the primary variables, for example a force, displacement, speed, or torque; the respective actual variables are recorded internally and reported back to the electronic computing device with a required integrity. In particular, no higher-level functions are implemented. Furthermore, no external sensors are connected to the at least one actuator.

In a further advantageous embodiment, the at least one actuator is configured to be programmed on the basis of a master-slave method. In particular, the intelligent actuator is thus programmable, but only in a master-slave configuration and in particular via the electronic computing device.

It is also advantageous if the at least one actuator has a hardware acceleration device. In particular, should for example security measures be necessary, the corresponding actuators can be provided with the aid of a hardware acceleration device, so that time delays in communication with the electronic computing device are minimized. Thus, safety in road traffic can be increased.

Further advantageously, the electrical/electronic architecture comprises at least one further electronic computing device and at least one further interface control unit, wherein the further electronic computing device is configured to communicate with the electronic computing device and to communicate with the further interface control unit. In other words, for a fault-tolerant system, the electronic computing device can be duplicated, wherein its interfaces are necessary exclusively for the power supply for bus systems. As a result, a redundant system can be achieved, which in particular is provided having a reduced number of components.

Another aspect of the present invention relates to a method of operating an electrical/electronic architecture for a motor vehicle, in which communication is established between an electronic computing device and at least one actuator of the motor vehicle.

It is provided that the electrical/electronic architecture comprises an interface control unit, wherein the at least one actuator communicates directly with the electronic computing device, and the at least one sensor device communicates directly with the interface control unit.

Advantageous embodiments of the electrical/electronic architecture are to be considered advantageous embodiments of the method. For this purpose, the electrical/electronic architecture has objective features that enable the method, or an advantageous embodiment thereof, to be carried out.

Additional features of the present invention result from the claims, the figures, and the description of the figures. The features and combinations of features mentioned above in the description, as well as the features and combinations of features mentioned below in the figure description and/or shown alone in the figures, can be used not only in the combination indicated in each case, but also in other combinations or on their own.

The present invention will now be explained in greater detail with reference to a preferred embodiment and with reference to the drawings.

DETAILED DESCRIPTION

Figures 1, 2:
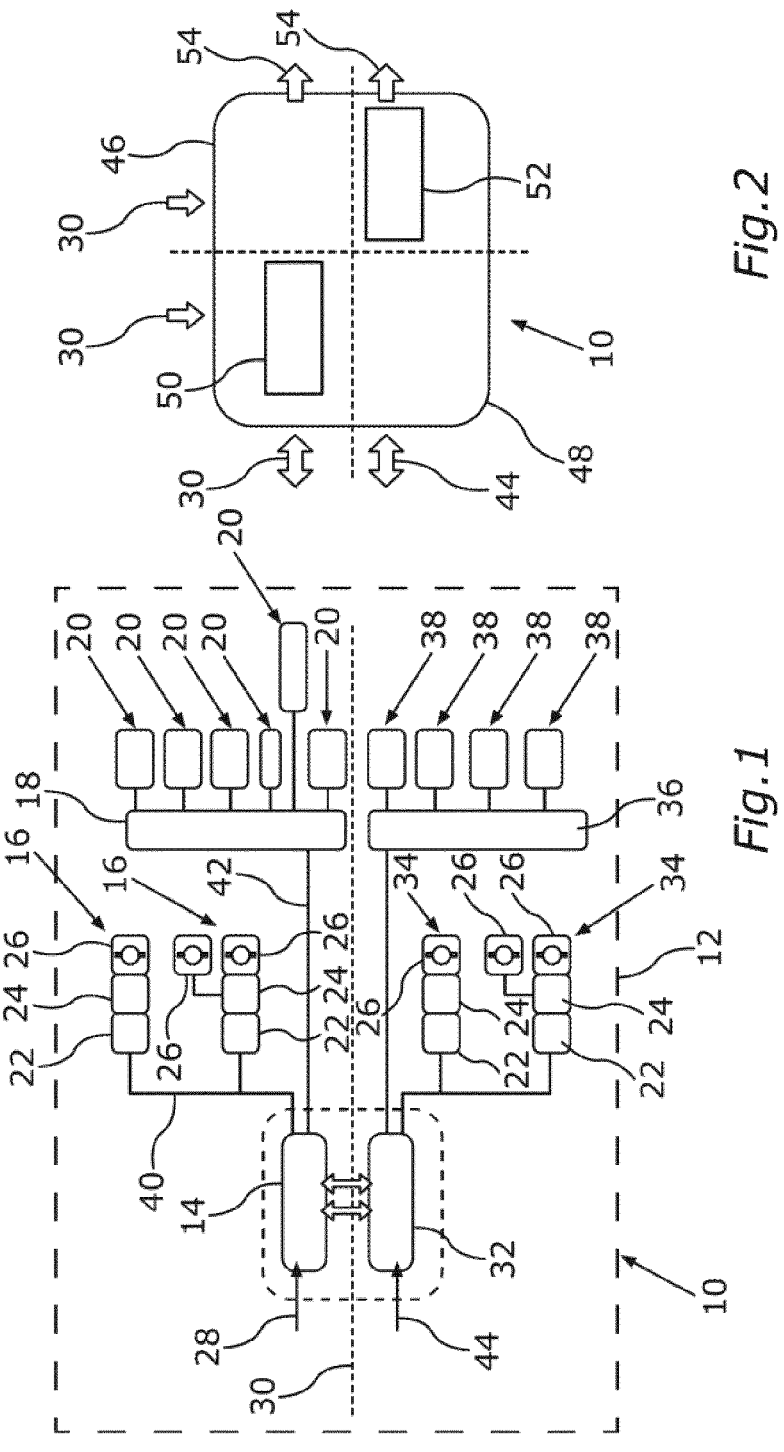
FIG. 1 shows a schematic view of an embodiment of an electrical/electronic architecture.
FIG. 2 shows another schematic view of an electrical/electronic architecture.

In the figures, identical or functionally identical elements are provided with the same reference signs.

FIG. 1 shows a schematic view of an embodiment of an electrical/electronic architecture 10 for a motor vehicle 12 depicted in purely schematic form. The electrical/electronic architecture 10 comprises at least one electronic computing device 14 and at least one actuator 16 of the motor vehicle 12.

The electrical/electronic architecture 10 comprises an interface control unit 18, which is in contact with at least one sensor device 20 of the motor vehicle 12 and the electronic computing device 14, wherein the at least one actuator 16 communicates directly with the electronic computing device 14, and the at least one sensor device 20 communicates directly with the interface control unit 18.

In particular, FIG. 1 shows that for example a brake control unit for a brake caliper can be actuated as an actuator 16. In particular, the electronic computing device 14 is in contact with for example the brake caliper control unit at the front left and the brake caliper control unit at the rear right. A respective caliper control unit may comprise a respective microcontroller 22 and an actuator sensing device 24. Furthermore, in the present embodiment, a respective actuator 16 comprises in particular a final control element 26, wherein in particular the rear right brake caliper comprises a second final control element 26, which is provided for example for a parking brake.

In the present case, different sensors may for example be regarded as a sensor device 20, and switches or DC motors may also be arranged alternatively to or in addition to the sensor device 20. For example, a wheel speed sensor for the front left, a wheel speed sensor for the rear right, a brake pedal displacement sensor, a yaw rate sensor, a wheel steering angle sensor, and a switch for triggering a parking brake may be considered to be the sensor device 20. For example, the sensors can be used to implement functions such as ABS, a basic brake function, DSC, or a parking brake.

The electronic computing device 14 is coupled to the motor vehicle 12 via a communication interface 28. Furthermore, for this purpose, the electronic computing device 14 has a power supply device 30 so that it can be supplied with power, for example from the electrical system of the motor vehicle 12.

FIG. 1 further shows that the electrical/electronic architecture 10 may comprise a further electronic computing device 32, which is in particular configured as a redundancy. In particular, the second electronic computing device 32 can communicate for example with additional actuators 34. The further actuators 34 may be for example a brake caliper control unit for the front right and a brake caliper control unit for the rear right. Furthermore, the further electronic computing device 32 can communicate with a further interface control unit 36, wherein the further interface control unit 36 can communicate with a redundant sensor system, wherein the redundant sensor system may thus in particular comprise further sensor devices 38. For example, other sensor devices 38 may be considered to include a wheel speed sensor for the front right, a wheel speed sensor for the rear left, a brake pedal travel sensor, and a parking brake switch.

Overall, FIG. 1 thus shows the electrical/electronic architecture 10 for domain driving/driving dynamics. The electronic computing device 14 can thus be duplicated, in particular for the so-called fault-tolerant system, and its interfaces are provided exclusively for the power supply and the bus system.

Furthermore, FIG. 1 shows in particular that the at least one actuator 16 communicates with the electronic computing device 14 via a bidirectional bus 40. In particular, the at least one actuator 16 is configured to control only one manipulated variable of the actuator 16, to detect an actual variable of the actuator 16, and to transmit the actual variable to the electronic computing device 14. The at least one actuator 16 is thus configured as an intelligent actuator. In particular, it may be provided that the at least one actuator 16 is configured to be programmed based on a master-slave method. Furthermore, the at least one actuator 16 may comprise a hardware acceleration device. Overall, FIG. 1 thus shows that the actuator 16 may be configured as a smart actuator 16, wherein the actuator communicates with the electronic computing device 14 via the fast bidirectional bus 40 and exclusively controls its primary variables as a function, for example a force, a displacement, a rotational speed, or a torque. The respective actual quantities are recorded internally and reported back with the required integrity. No higher functions are implemented. No other external sensors are connected. If the smart actuator 16 is programmable, then only in the master-slave configuration via the electronic computing device 14. If security measures are necessary, they are implemented with the aid of the hardware acceleration device in order to minimize time delays.

The interface control unit 18 or the further interface control unit 36 communicates in particular unidirectionally with the electronic computing device 14 or the further electronic computing device 32. The interface control units 18, 36 supply power to the sensor systems and simple actuators, read out switches, read in and digitally process sensor values, and actuate display elements. These have fast communication with short cycle time with the electronic computing device 14. In other words, the interface control unit 18 is in contact with the electronic computing device 14 via a unidirectional bus 42. The assignment of the sensor devices 20 to the interface control unit 18 is function-dependent, in contrast to the bottom-up concepts according to the prior art, which imply among other things geometric proximity. The interface control unit 18 can thus be used to map the equipment and function variants, while the actuators 16 can form a true modular system across vehicle series. In particular, the electronic computing device 14 is scalable, also with respect to the technical advancements of micro-processors, since microprocessors exclusively provide the computing power and are connected via standardized buses. The structuring of the redundant active chains is shown in particular in FIG. 1. The redundant active chains are cut along the power supply.

A fundamental characteristic of these active chains is a clear degradation concept. Through self-diagnosis, each of the redundant active chains detects a malfunction. The sensor devices 20, actuators 16, and the electronic computing devices 14, 32 each perform this function independently. The components assume a safe state should faults be detected.

In particular, FIG. 1 further shows that the electrical/electronic architecture 10 comprises at least the further electronic computing device 32 and at least the further interface control unit 36, wherein the further electronic computing device 32 is configured to communicate with the further interface control unit 36.

FIG. 2 shows a schematic view of another embodiment of the electrical/electronic architecture 10. In particular, the electrical/electronic architecture 10 may include a power supply manager 46 and a communication manager 48. In particular, the further electronic computing device 32 is coupled to the motor vehicle 12 via a further communication interface 44. In particular, FIG. 2 shows that a first function 50 can be mapped onto the first electronic computing device 14. However, this function 50 may also be mapped as a mirror function 52 onto the second electronic computing device 32. If an error should now occur within the function execution, a fail-silent mode 54 can be set.

In other words, emergency operation can be provided so that the components enter a safe state, i.e. fail-silent mode 54, and the affected active chain shuts down completely. The system is then in emergency mode.

Overall, the present invention demonstrates an E/E architecture for fault-tolerant automotive systems.

The present invention also relates to a method for operating an electrical/electronic architecture 10 for a motor vehicle 12, in which communication is established between an electronic computing device 14 and at least one actuator 16 of the motor vehicle 12, wherein the electrical/electronic architecture 10 comprises an interface control unit 18, wherein the at least one actuator 16 communicates directly with the electronic computing device 14, and the at least one sensor device 20 communicates directly with the interface control unit 18.

LIST OF REFERENCE SIGNS

10 Electrical/electronic architecture
12 Motor vehicle
14 Electronic computing device
16 Actuator
18 Interface control unit
20 Sensor device
22 Microcontroller
24 Actuator sensing device
26 Final control element
28 Communication interface
30 Power supply device
32 Further electronic computing device
34 Further actuator
36 Further interface control unit
38 Further sensor device
40 Bidirectional bus
42 Unidirectional bus
44 Further communication interface
46 Power supply manager
48 Communication manager
50 Function
52 Mirror function
54 Fail-silent mode

The invention claimed is:

1. An electrical/electronic architecture for a motor vehicle, comprising:

an electronic computing device, comprising at least a first processor, and configured to communicate with at least one actuator of the motor vehicle; and an interface control unit, comprising at least a second processor, that is in contact with at least one sensor device of the motor vehicle and the electronic computing device, wherein the at least one actuator is configured to:

communicate directly with the electronic computing device via a bidirectional bus;

control at least one manipulated variable of the actuator;

detect an actual variable of the actuator; and transmit the actual variable to the electronic computing device, the at least one sensor device is configured to communicate directly with the interface control unit, wherein the interface control unit communicates with the electronic computing device via a unidirectional bus, wherein the at least one actuator comprises an intelligent actuator, and wherein no other external sensors are attached to the at least one actuator.

2. The electrical/electronic architecture according to claim 1, wherein the electronic computing device comprises:

only one power supply interface for the at least one actuator, for the at least one sensor device, and for the interface control unit, and only one bus interface configured to communicate with the at least one actuator and the interface control unit.

3. The electrical/electronic architecture according to claim 1, wherein the at least one actuator is configured to:

control only one manipulated variable of the actuator.

4. The electrical/electronic architecture according to claim 1, wherein the at least one actuator is configured to be programmed based on a master-slave method.

5. The electrical/electronic architecture according to claim 1, wherein the at least one actuator comprises a hardware acceleration device.

6. The electrical/electronic architecture according to claim 1, further comprising:

at least one further electronic computing device comprising at least a third processor; and at least one further interface control unit comprising at least a fourth processor, wherein the at least one further electronic computing device is configured to communicate with the electronic computing device and to communicate with the further interface control unit.

7. A method for operating an electrical/electronic architecture for a motor vehicle, the method comprising:

communicating between an electronic computing device, comprising at least a first processor, and at least one actuator of the motor vehicle;

communicating, by the at least one actuator, directly with the electronic computing device via a bidirectional bus;

detecting, by the at least one actuator, an actual variable of the actuator; and transmitting, by the at least one actuator, the actual variable to the electronic computing device, wherein the electrical/electronic architecture comprises an interface control unit comprising at least a second processor, wherein the method further comprises:

communicating, by at least one sensor device, directly with the interface control unit of the electrical/electronic architecture;

communicating, by the interface control unit, with the electronic computing device via a unidirectional bus; and controlling, by the at least one actuator, at least one manipulated variable of the at least one actuator, wherein the at least one actuator comprises an intelligent actuator, and wherein no other external sensors are attached to the at least one actuator.

8. The method according to claim 7, further comprising:

providing power for the at least one actuator, for the at least one sensor device, and for the interface control unit via only one power supply interface of the electronic computing device; and communicating, with the at least one actuator and the interface control unit via only one bus interface of the electronic computing device.

9. The method according to claim 7, wherein controlling, by the at least one actuator, the at least one manipulated variable of the actuator comprises: controlling, by the at least one actuator, only one manipulated variable of the actuator.

10. The method according to claim 7, further comprising: programming the at least one actuator based on a master-slave method.

11. The method according to claim 7, wherein the at least one actuator comprises a hardware acceleration device.

12. The method according to claim 7, further comprising:

communicating, by at least one further electronic computing device, comprising at least a third processor, of the electrical/electronic architecture, with the electronic computing device; and communicating, by the at least one further electronic computing device, with at least one further interface control unit, comprising at least a fourth processor, of the electrical/electronic architecture.

13. The electrical/electronic architecture according to claim 5, wherein the hardware acceleration device is configured to implement at least one security measure.

14. The electrical/electronic architecture according to claim 1, wherein the interface control unit is in contact with at least one second actuator, and is configured to control the at least one second actuator.

15. The electrical/electronic architecture according to claim 1, wherein the interface control unit is in contact with a display element, and is configured to actuate the display element.

* * * * *